No. 891,557. PATENTED JUNE 23, 1908.
S. A. MARAZZANI.
RING OF REMOVABLE MAIL COVER FOR PNEUMATIC TIRES.
APPLICATION FILED NOV. 4, 1907.
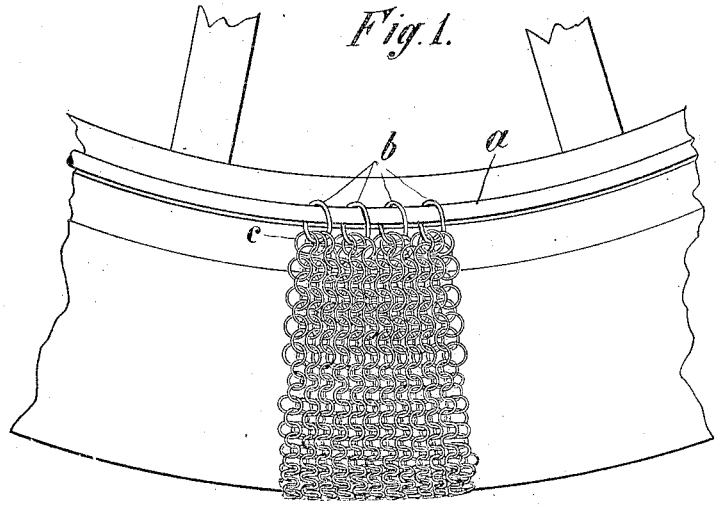
Fig. 1.
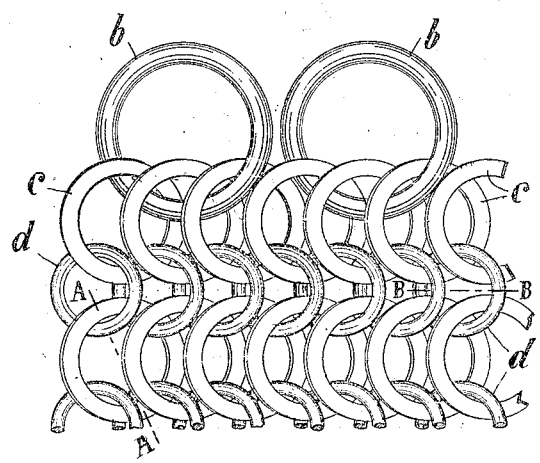
Fig. 2.
Fig. 3.
Fig. 4.
Witnesses
inventor
S. A. Marazzani
by Stewart & Stewart
attys.

UNITED STATES PATENT OFFICE.

SALVATORE AUTERI MARAZZANI, OF PALERMO, ITALY.

RING OF REMOVABLE MAIL-COVER FOR PNEUMATIC TIRES.

No. 891,557. Specification of Letters Patent. Patented June 23, 1908.

Application filed November 4, 1907. Serial No. 400,643

*To all whom it may concern:*

Be it known that I, SALVATORE AUTERI MARAZZANI, a subject of the King of Italy, residing at Villa Boscogrande, Via Villafranca, in the city of Palermo, Kingdom of Italy, have invented certain new and useful Improvements in Rings of Removable Mail-Covers for Pneumatic Tires; and I do hereby declare the following to be a full, clear, and exact description of the same.

This invention has for its object several improvements in the rings of a removable mail cover for pneumatic tires and chiefly for those of automobile wheels.

The invention has to be considered as appendix to that for which application has been filed on the 23rd of March 1907 and to which I intend to refer for all that may not be mentioned in the present specification.

In describing my invention I refer to the annexed drawings illustrating the same, and in which.

Figure 1 is a partial elevation of a wheel furnished with a portion of the mail cover equal to that shown in the drawing annexed to the above mentioned application; Fig. 2 shows on an enlarged scale a small portion of the mail cover. Figs. 3 and 4 are respectively sections on lines A—A B—B of Fig. 2, that is they are cross sections of the two series of rings of which the mail cover is composed.

The cover of the pneumatic tire as shown in Fig. 1, is made of a strip of mail, which surrounds the whole tube and is secured in place by two great hoops —a—. These hoops are placed on the two borders of the mail cover and are stuck into great rings —b— each of which embraces three of the rings —c— on the corresponding border. The rings which compose the mail cover are of two kinds and are placed in alternative rows, those —c— just mentioned and the rings —d—. The rings —c— (Fig. 3) are of a larger diameter, have a flattened rectangular section and are of a slightly concave shape. The rings —d— (Fig. 4) are smaller and are of circular section. The rings are united by autogenous joint.

The conformation of the rings as described above renders the mail cover more uniform and compact; the flat rings adhere well to the surface of the pneumatic tire, especially on account of their concave shape turned toward the said tire.

Having now particularly described and ascertained the value of my said invention and in what manner the same is to be performed I declare that what I claim is:

1. In a removable mail cover for pneumatic tires of automobile wheels, two series of rings constituting alternately the cover, one of the series being formed of greater rings of flattened rectangular section and of slightly concave shape, the other series being formed of smaller rings of circular section.

2. In a cover for pneumatic tires, rings of flattened cross-section and other rings interlocking to form a protecting fabric.

3. In a cover for pneumatic tires, concave rings of flattened cross-section and other rings in circular rows alternately placed, interlocking to form a protecting fabric.

In testimony whereof I have affixed my signature, in the presence of two witnesses.

SALVATORE AUTERI MARAZZANI.

Witnesses:
W. W. BENEDETTI,
O. RAZZI.